United States Patent [19]

Perdikaris et al.

[11] Patent Number: 5,163,047
[45] Date of Patent: Nov. 10, 1992

[54] TIME DIVISION MULTIPLEX SYSTEM AND METHOD HAVING A TIME SLOT REUSE CAPABILITY

[75] Inventors: A. Perdikaris, Freehold; Manoel A. Rodrigues, Red Bank, both of N.J.

[73] Assignee: AT&T Bell Laboratories, Murray Hill, N.J.

[21] Appl. No.: 708,316

[22] Filed: May 31, 1991

Related U.S. Application Data

[62] Division of Ser. No. 407,998, Sep. 15, 1989, Pat. No. 5,121,388.

[51] Int. Cl.[5] .............................. H04J 3/02; H04J 3/24
[52] U.S. Cl. .................... 370/85.4; 370/85.1; 370/94.1; 370/85.7; 370/95.1; 370/85.13
[58] Field of Search ............... 370/85.13, 85.14, 85.15, 370/85.1, 85.4, 85.5, 94.1, 94.2, 94.3, 95.1, 60, 60.1, 85.7

[56] References Cited

U.S. PATENT DOCUMENTS

| Re. 33,426 | 11/1990 | Sugimoto et al. | 370/85.14 |
|---|---|---|---|
| 4,754,420 | 6/1988 | Jensen | 370/85.13 |
| 4,922,503 | 5/1990 | Leone | 370/85.13 |
| 5,031,174 | 7/1991 | Natsume | 370/85.14 |

Primary Examiner—Douglas W. Olms
Assistant Examiner—Wellington Chin
Attorney, Agent, or Firm—John A. Caccuro

[57] ABSTRACT

A multi-user Time Division Multiplex (TDM) system includes a plurality of stations and at least one erasure node located between groups of the stations. When a station reads the destination identification bits of a received time slot and determines that it is the destination for that slot, it sets the status of a slot-read bit, which follows the destination identification bits, to indicate that the slot has been read. When an erasure node detects a set slot-read bit it erases all or part of the associated slot, thereby enabling the reuse of that slot by subsequent stations. An interface apparatus, which enables the TDM system to connect the other TDM systems, filters intra-system communications from inter-system communications using the slot-read bit. When the interface apparatus detects a set slot-read bit it knows that the slot has been read and, therefore, is an intra-system communication which should be blocked or discarded. Since inter-system communications have not been read, the slot-read bit is not set and, consequently, the interface apparatus routes that slot to one of the other TDM systems as determined by the destination identification bits of the slot.

9 Claims, 5 Drawing Sheets

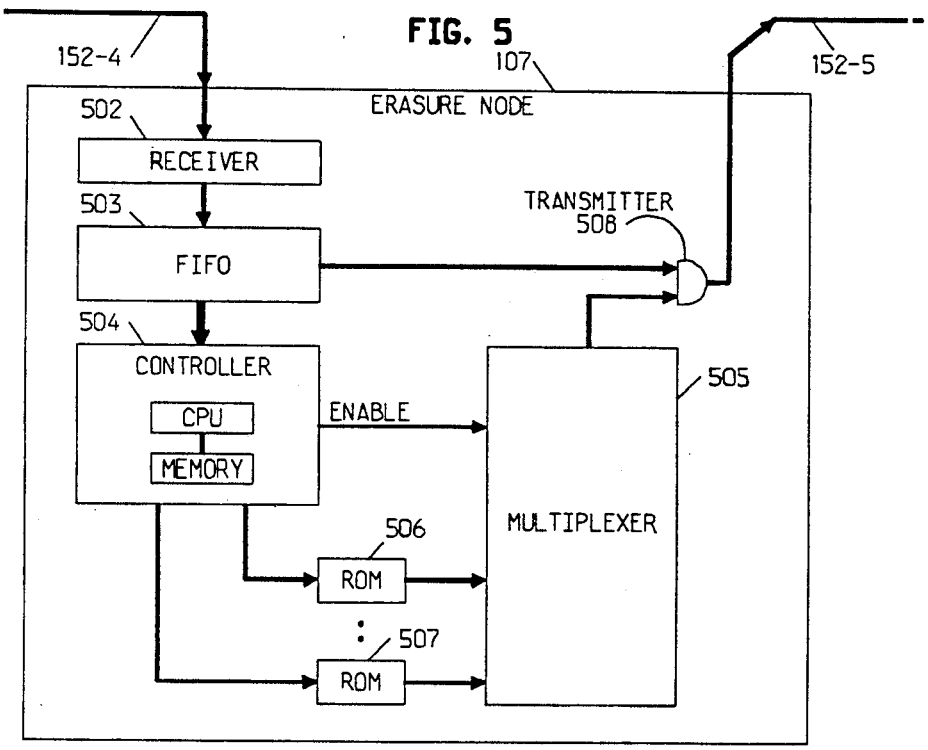
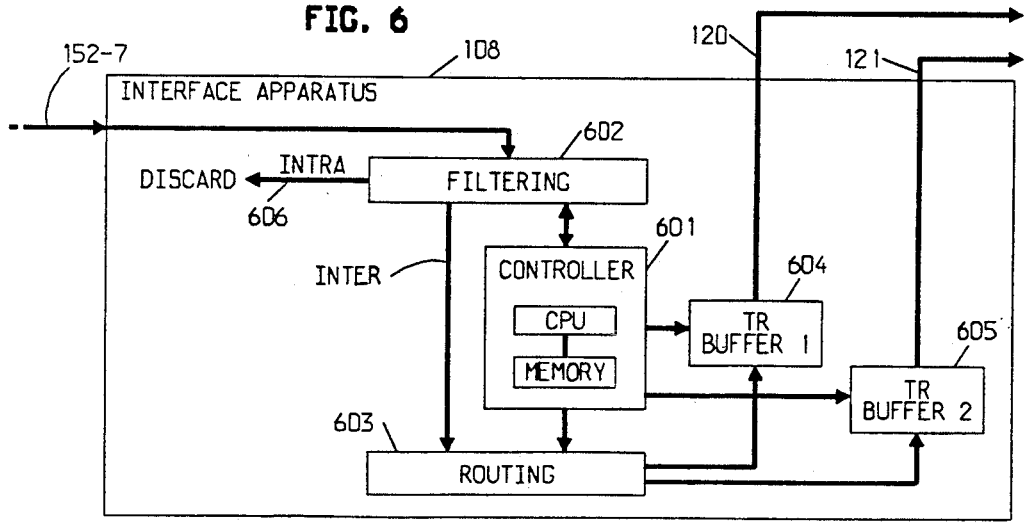

TIME DIVISION MULTIPLEX SYSTEM AND METHOD HAVING A TIME SLOT REUSE CAPABILITY

This is a division of application Ser. No. 407,998 filed Sep. 15, 1989, now U.S. Pat. No. 5,121,388.

TECHNICAL FIELD

The present invention relates to time division multiplex (TDM) systems and, more particularly, to a method and arrangement for enabling a destination station to release time slots for reuse by other stations of the TDM system.

BACKGROUND OF THE INVENTION

A Multi-point Time Division Multiplex (TDM) system typically includes a TDM bus and a plurality of stations connected to the bus. In such an arrangement a station may use one or more time slots on the bus for communications with other stations or devices connected to the bus. Because time slots can only be used once while propagating from one end of the bus to the other, the time slots used for communication by "upstream" stations are not available for communication by "downstream" stations. Undesirably, during heavy time slot usage by the upstream stations, the access to the bus by the downstream stations may encounter additional delay.

One known technique suggests that time slots be released once they reach a destination station. This technique requires that each destination station read a complete time slot of data and erase the data from that time slot thereby enabling the reuse of that time slot by downstream stations. Because a station does not know it is a destination station until it has read a substantial part of data in each time slot, a latent delay equal to a fraction of one time slot exists for each station connected to the bus. Undesirably, in system arrangements having a significant number of stations, the delay introduced is unacceptable.

What is lacking in the art is an arrangement which enables TDM systems to reuse time slots without adding substantial delay to the overall data transmission time.

SUMMARY OF THE INVENTION

In accordance with the present invention, a Time Division Multiplex (TDM) system includes a plurality of stations and at least one erasure node which cooperate together to enable the reuse of time slots without adding substantial delay to the overall data transmission time. Each station determines if it is the destination for information received in a first time interval and, if so, that station transmits control information having a first value during a second time interval. In one embodiment, the first interval information includes a receive station identification; and the second interval information includes a slot-read bit of the time slot. In another embodiment, the first and second intervals are part of the same time slot. Using this technique, the transmission delay incurred at each station can be reduced to one data symbol time (e.g., one bit time).

According to the present invention, each erasure node detects the aforementioned information and when this control information has a first value, a portion of the first interval information is changed. In one embodiment the erasure node detects the slot-read bit and in response erases a portion of the information in the associated time slot. In this manner, erased time slots are made available to all stations located downstream of the erasure node. This slot reuse capability enabled by the erasure nodes greatly increases the aggregate throughput data transmission rate of the TDM system. The transmission delay incurred by each erasure node is equal to the number of bits between the start of a time slot and the location of the control bit. However, because the number of erasure nodes is much less than the number of stations, overall system transmission delay is essentially determined by the stations and is much less than in prior art arrangements.

In another embodiment of the present invention, the TDM system includes an interface apparatus to connect the TDM system to other TDM apparatus (e.g., local area networks). This interface apparatus filters the local TDM system (intra-system) traffic from the non-local TDM system (inter-system) traffic destined for the other connected TDM apparatus based on the value of the control information received in the second time interval. In one embodiment the slot-read bit is utilized as the control information.

BRIEF DESCRIPTION OF THE DRAWING

In the drawing

FIG. 5 shows a detailed block diagram of an erasure node; and

FIG. 6 shows a detailed block diagram of an interface apparatus.

DETAILED DESCRIPTION

Figure 1:
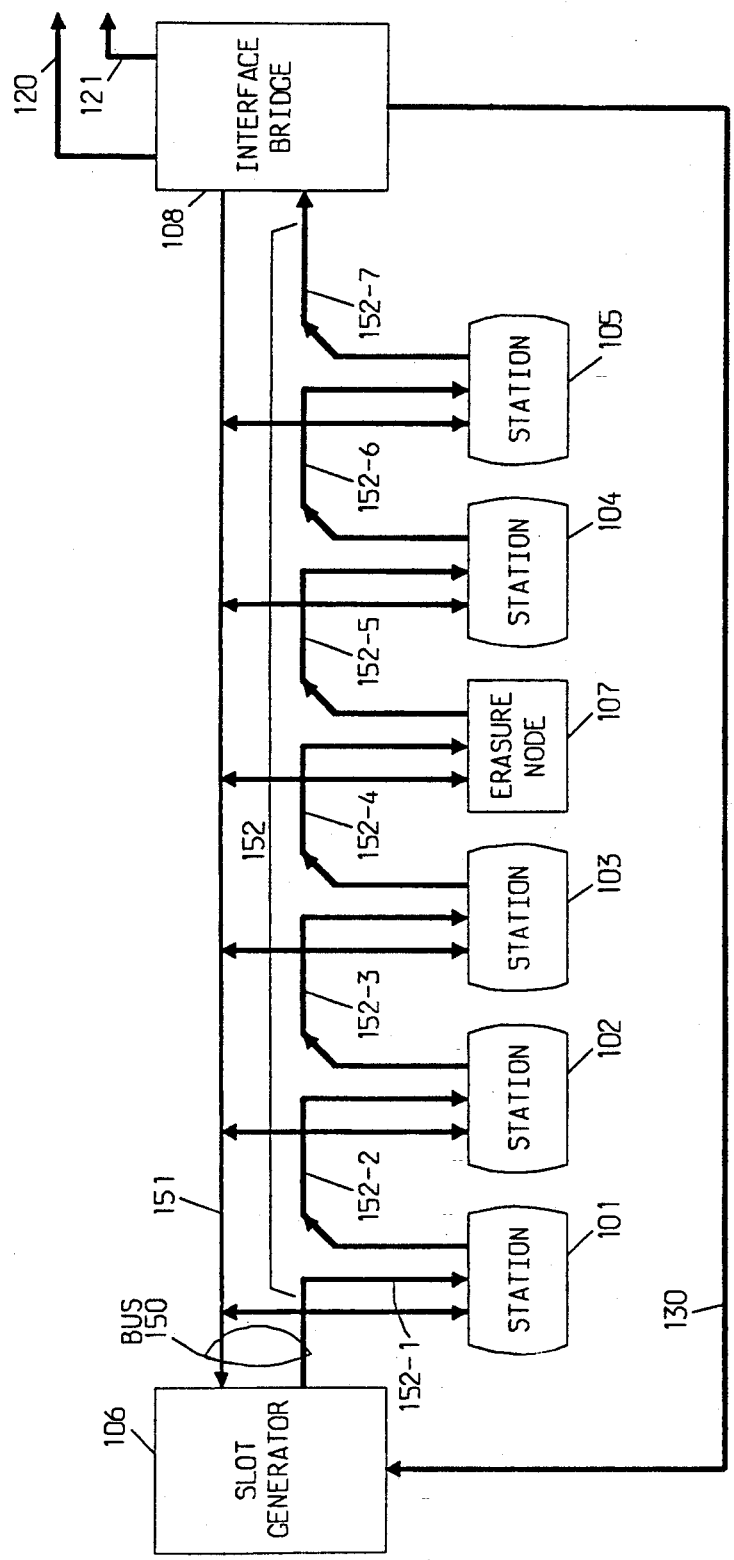
FIG. 1 shows an illustrative TDM system useful in describing the operation of the present invention.

Shown in FIG. 1 is an illustrative block diagram of a Time Division Multiplex (TDM) system 100 including apparatus such as stations 101–105, time slot generator 106, erasure node 107 and interface apparatus 108 all connected to data bus 150. Interface apparatus 108 serves to interconnect the TDM system 100 to one or more other bus networks via interconnection paths 120–121. In typical embodiments of the invention, a TDM system would include several erasure nodes with each erasure node inserted between large groups of stations (perhaps 50 or more). Thus, the arrangement shown in FIG. 1 is provided more to help describe the operation of the present invention than to illustrate a typical TDM system application.

Data bus 150 is a bi-directional bus comprising two identical unidirectional buses 151 and 152. For ease of illustration, the detailed connection of bus 151 is not shown but is symmetrically identical to that illustrated for bus 152.

Bus 152 is a uni-directional bus connected in series with the various apparatus (i.e., stations, etc.) for transmitting information (i.e., control and data signals) from left to right. Bus 151 is, similarly, another uni-directional bus used for transmitting from right to left.

It should be noted that the various segments of bus 152, namely, 152-1 through 152-7 could be implemented using any of a variety of transmission facilities, using any appropriate data speed and modulation scheme, and using fiber, copper or air as the transmission medium.

Moreover, adjacent bus segments, e.g., 152-1 and 152-2, do not have to be identical, they can utilize different transmission media each using different modulation schemes. Thus, buses 151 and 152 may be implemented using any well known type of communication channels which enable communications between the various apparatus connected thereto.

It should also be noted that bi-directional communications between the various apparatus may be affected by connecting bus 152 in a continuous loop configuration by utilizing return path 130. Such a connection would eliminate the need for the symmetrical second uni-directional bus 152. The present invention will also operate over such a loop bus arrangement. In such an arrangement the slot generator 106 and interface apparatus 108 could be combined into one apparatus.

While the operation of the present invention will be described with reference to uni-directional data flow along bus 152, it should be noted that data flow in the opposite direction takes place in a similar manner along bus 151.

The system illustrated in FIG. 1 is representative of many multi-station data communication networks including Local Area Networks (LANs), or Metropolitan Area Networks (MANs). All of these systems exhibit the previously recited problems, namely increasing the data throughput (efficiency) without incurring large station delay or latency. Station latency is the delay which occurs when a data packet (e.g., a data frame) is transmitted through that station. Data transmission efficiency is improved when a system does not let a data packet propagate beyond the destination station for that data packet.

According to the present invention, stations 101-105 monitor slots of the data packet (or data frame) passing by over bus 152, so as to introduce little transmission delay (typically, one bit or symbol time delay per station). When a station determines that it is the destination of a data slot, it sets a particular status in a control bit (slot-read bit) of that slot. Special stations called erasure nodes (e.g., 107) are selectively placed along the bus between groups of stations. These erasure nodes detect the status of the slot-read bit in each slot. When that particular status is detected in the slot-read bit, a portion (part or all) of the information is erased in the slot associated with that slot-read bit. As a result, the erased slot is available for utilization by stations downstream from that erasure node. The transmission delay incurred by erasure node 107 is equal to the number of bits between the start of a time slot and the location of the slot-read bit.

Typically, erasure node 107 is spaced between groups of stations having a common communication interest. For example, erasure node 107 may separate stations of one department, or located on one floor of a building, from stations of other departments or floors. The erasure node enables the reuse of those slots that were used for intra-department or intra-floor communications, i.e., the intra-group communication slots that have reached their destination station(s). Typically, the ratio of intra-group communications greatly exceeds the non-intra-group communications. Consequently, because most slots can be reused, the overall data transmission throughput of the TDM system is greatly increased.

Moreover, because in a TDM system the number of erasure nodes is much less than the number of stations (typically, one erasure node per 50 to 100 stations), the overall transmission delay is mostly determined by the number of stations in the TDM system. Additionally, because most TDM system communications are intra-group transmissions, they never incur the erasure node delay. Thus, even though the transmission delay incurred by each erasure node 107 may be several times the delay of a station (e.g. 101), they add minimally to the overall average transmission delay exhibited by the TDM system.

Figure 2:
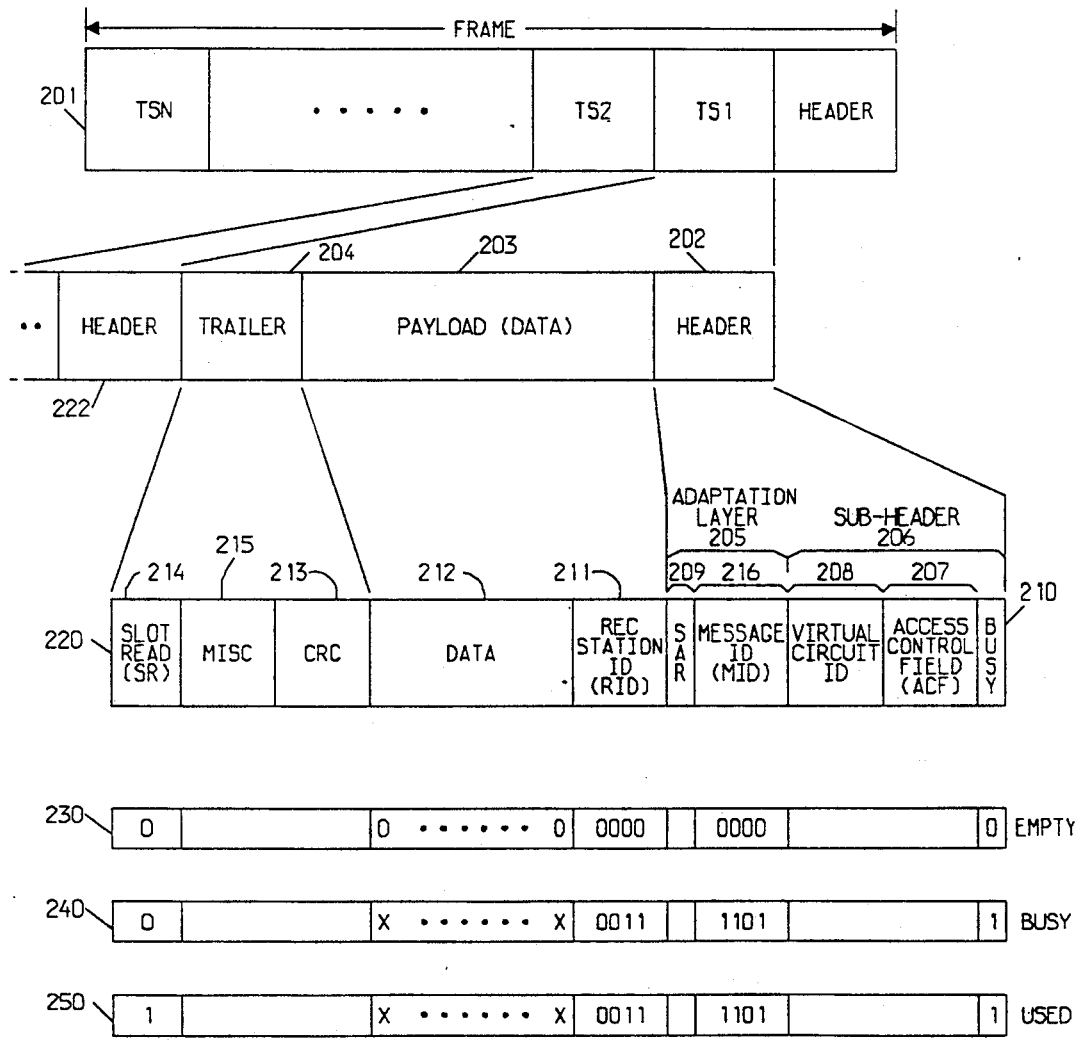
FIG. 2 shows the frame format, the format of a time slot and illustrative examples thereof.

With reference to FIG. 2, we describe an illustrative data frame format used by the system shown in FIG. 1. The illustrated frame format is representative of an IEEE 802.6 protocol which uses the Asynchronous Transfer Mode (ATM) slot format.

Data frame 201 includes a header and the plurality of time slots TS1-TSN. Each time slot (hereinafter slot, e.g., TS1) would typically include a plurality of time intervals including a header 202, a payload or a data section 203, and a trailer 204. The header 202 includes, illustratively, a sub-header 206 and an adaptation layer 205. The sub-header may include multi-user access information, e.g., access control field (ACF) 207; address information e.g., virtual circuit identifier (VCI) 208; and; priority information (not shown), etc., contained therein. The adaptation layer 205 may include a message identification number (MID) 216 and a segmentation and reassembly (SAR) field (209).

The access control field (ACF) 207 includes information required by a contention resolution protocol (not shown) as well as a busy bit 210 which indicates if the particular slot is in use or is empty. The virtual circuit identifier (VCI) 208 includes a channel address when more than one logical channel exists on bus 150 or when the interface apparatus 108 has several buses connected thereto. Note a logic channel could exist for carrying communications between a predefined subset of all the stations (e.g., 201-203) connected to bus 150.

The message identification number (MID) 216 is assigned to the message by the station that originated the transmission of the message. Messages of variable sizes can be transmitted over the system of FIG. 1. When the length of the transmitted message, including the received station identification (RID) 211 (also referred to herein as destination station address), and data exceed the payload 203, the message is segmented into multiple slots (as many as required). Each slot is identified using the same MID 216 and the appropriate segmentation and reassembly field (SAR) 209 bits. The SAR 209 bits define whether the slot contains the beginning, continuation or last slot of data of a message requiring multiple slots to transmit. In a multiple slot message the first slot contains MID 216, SAR 209 and RID 211 while the subsequent messages include only MID 216 and SAR 209.

The payload 203 segment of the first slot is used to send all or part of a message. The payload 203 segment may contain the receive station identification (RID) 211 and some or all of the data 212 of that message. As noted, a long message may require several slots while a shorter message may require only one slot. The RID 211 of each slot is monitored by each station 201-205 as each slot passes over bus 150 and when RID 211 matches a station's address, that station reads the information in that slot. If segmentation and reasembly field (SAR) 209 indicates that the slot is the first slot of a multi-slot message, the station will store the message identification address (MID) 216 for use in identifying subsequent slots associated with the multi-slot message.

It should be noted that the receive or destination station identification (RID) 211 can also be included in virtual circuit identifier (VCI) 208. Moreover, the RID 211 can be determined from MID 216, in those instances where MID 216 is used to identify a unique combination of a transmitter and a receiver station. In such an arrangement, each transmit station uses the MID 216 associated with it and the receive station it wants to transmit to, and each receive station checks the received MID 216 against a table of prestored MIDs which identify messages which are to to be received by that station. The MID 216, as noted, also enables the receiver station to identify the transmit station or source of the message. There also could exist a source station ID (not shown) next to the receive station identification (RID) 211.

The trailer section 204 may, illustratively, include error correction/detection information (CRC) 213, slot read information (SR) 214 (which is utilized for erasure node operation), and other miscellaneous information 215. It should be understood that some TDM systems have a time slot format that includes only the header 202 and payload 203 sections. With such a format, information from the trailer 204 section is incorporated as part of the header. Consequently, the SR 214 information would be located in the time slot header of such a TDM system. Moreover, in accordance with the teachings of the present invention, the SR 214 information for a received slot (e.g., TS1) can be located in a header (e.g., 222) of a subsequent slot (i.e., TS2). Each station 101–105 erasure node 107 and interface apparatus 108 would then associate slot read information (SR) 214 with the proper slot.

With joint reference to FIGS. 1 and 2 we describe the operation of the present invention. In the following description, the first digit of an element's reference number indicates the figure where that element is located. Slot generator 106 includes well known circuitry for continuously generating the frames of slots shown in 201 each slot having the format shown in 220. Slot generator 106 continuously outputs a frame 201 of empty slots as shown by 230, over bus segment 152-1.

The following paragraphs assume that station 101 desires to transmit a message over bus segment 152-2 to destination station 103. When station 101 receives slot 220 from slot generator 106 over bus segment 152-1, the busy bit 210 of slot 230, is checked to ascertain whether the slot 230 is empty or full. Note, slot 230 is always empty for the first station 101 of a TDM system, but this may not be so for the other TDM system stations (102–105).

As will be discussed in the following paragraphs stations 101–105, erasure node 107 and interface apparatus 108 may determine that a slot is empty, busy, or used by checking the status of busy bit 210 and slot read (SR) bit 214. An empty slot 230 is indicated when the status of busy bit 210 is logic 0 in our example. An occupied or busy slot 240 is indicated when the status0of the busy bit 210 is logic 1 and SR bit 240 is logic 0. A read or used slot 250 is indicated when the status of both busy bit 210 and SR bit 240 are logic 1.

In our example, since slot 230 is empty, station 101 inserts a message identification number (MID) 216 (corresponding to the message number); receive station identification (RID) 211 (corresponding to the destination station number 103); data (X . . . X); slot read (SR) bit 214 at logic 0; and sets the busy bit 210 to logic one. Station 101 outputs this information in the format shown by 240. Note, if the message from station 101 is longer than the available bits in the payload 203, then segmentation and reassembly bits (SAR) 209 are set to indicate to receiver station 103 that this slot is the first slot of a multi-slot message. We assume that station 101 is sending a message requiring only one time slot 240 for transmission to station 103.

Station 102 receives over bus segment 152-2 the message in slot 240 and determines from receive station identification (RID) 211 that is not the destination station for slot 240. Station 102 processing delays the transmission only one bit time, as will be discussed in a later paragraph, and thereafter transmits the message over bus segment 152-3.

Station 103 receives the slot 240 over bus segment 152-3 and determines from RID 211, as will be described in a later paragraph, that it is the destination station for the message (information) in slot 240. After reading the message, station 103 sets the status of slot read (SR) bit 214 to indicate that the slot has been read. Station 103 processing delays the transmission only one bit time and then transmits the modified message in slot 240 over bus segment 152-4.

Erasure node 107 connects to bus segment 152-4 and receives the message as shown in slot 250. Erasure node 107, as will be discussed in a later paragraph, erases part or all of the information contained in all slots which are received having an SR bit 214 indicating that the slot has been read (e.g., logic 1 in our example). In actuality, erasure node 107 erases or clears all the bits of the time slot except, perhaps, selected bits of access control field (ACF) 207 depending on the particular contention resolution protocol used in conjunction with the ACF 207.

Erasure node 107 may also read and store the data in payload 203 for transaction billing or recording purposes. Erasure node 107 outputs the resulting erased or empty slot 230 onto bus segment 152-5. Thereafter, stations 104 and 105 downstream from erasure node 107 have an opportunity to reuse the empty slot 230 to transmit messages.

To describe the general operation of interface apparatus 108, assume that station 101 desires to transmit a message to a station or device (not shown) located on bus 120 connected to interface apparatus 108. As before, station 101 inserts, in slot 240, the correct message identification number (MID) 216, receive station identification (RID) 211 (of the destination station on bus 120), and data (X . . . X) sets the busy bit 210 to logic one and leaves the slot read (SR) bit 214 at logic 0. Stations 102 and 103 monitor all passing slots looking for an empty slot (e.g., slot 230 with the busy bit 210 at logic 0) if they also want to transmit a message (not our present example), and looking for a busy slot (e.g., 240) addressed to them (as in our example). Thus, stations 102 and 103 do not read slot 240 since they are not the addressee of the message. This monitor process incurs a delay of one bit time per station as discussed in a later paragraph.

Slot 240 proceeds to erasure node 107 which monitors the SR bit 214 of all passing slots. Since SR bit 214 is logic 0 in slot 240, indicating an empty or full slot (i.e., not a used slot), erasure node 107 lets slot 240 pass without erasing any information therein. Note, the transmission delay incurred by erasure node 107 is equal to the time from the start of slot 240 (i.e., busy bit 210) through to the SR bit 214 (the last bit in our illustrative slot format of FIG. 2). Obviously, less transmission delay would be incurred if SR 214 bit was located just after the receive station address (RID 211).

Stations 104 and 105 handle slot 240 in the same manner as stations 102 and 103.

When slot 240 reaches interface apparatus 108 the destination station address (i.e., RID 211) is compared against station addresses located in an address table to select which of the two remote TDM buses 120 and 121 connect to the destination station. Interface apparatus 108 then routes the message (slot 240) from bus 150 to the selected bus 120 or 121.

Figure 3:
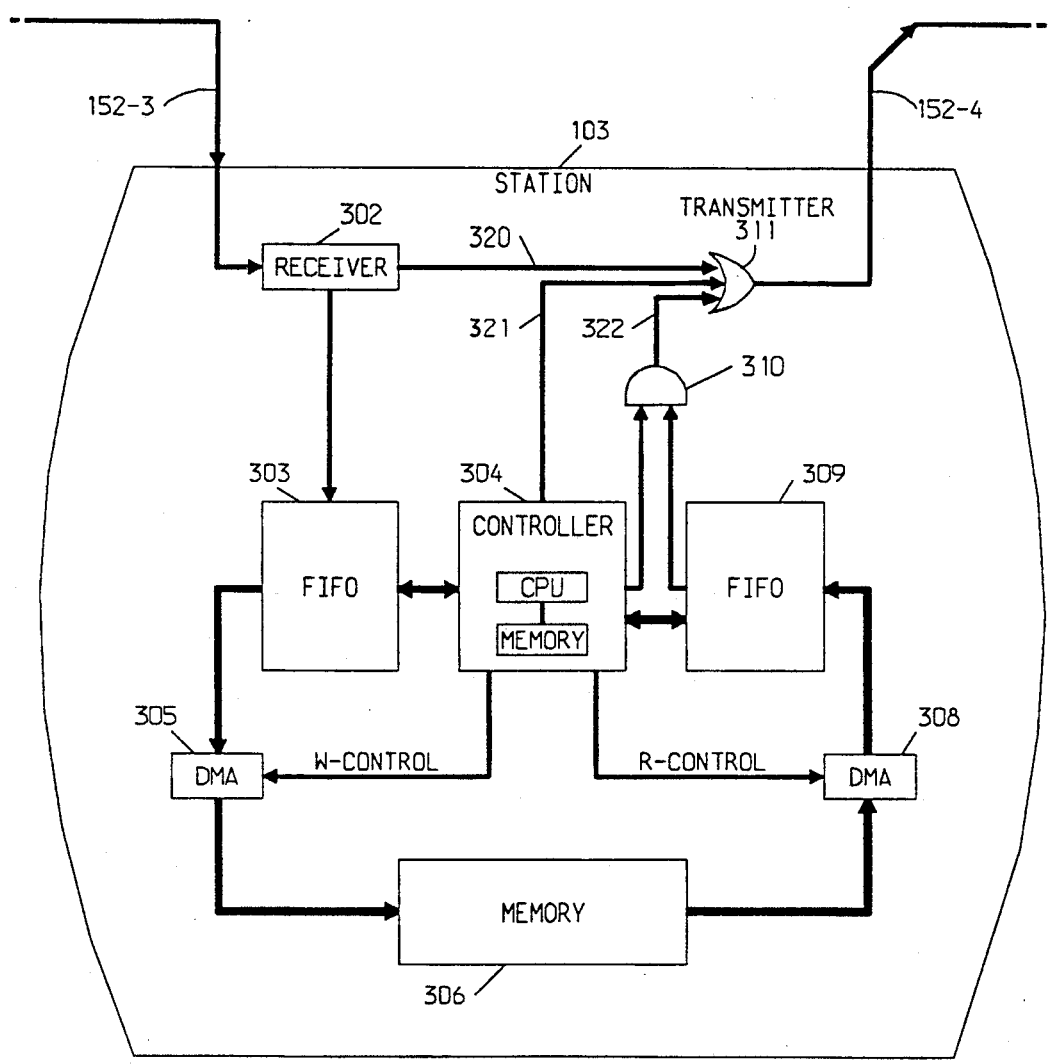
FIG. 3 shows a detailed block diagram of a station.

With reference to FIGS. 2 and 3 the operation of a station (e.g. 103) is described. All stations 101-105 operate in the same manner. Stations may include apparatus such as personal computers, workstations, servers, hosts, inter-networking devices, concentrators, printers, disk-servers, PBXs, digital phones, digital video or any data generating equipment.

Shown in FIG. 3 is a functional block diagram of station 103. There is an input from the bus segment 152-3 into the station receiver 302. The receiver 302 converts the encoded or modulated signals used on bus 152 to the digital signal format used by station 103. The transmission delay incurred in processing data at the receiver 302 does not have to be longer than one data symbol time. A data symbol is the unit of transmission on the bus, which depends on the physical layer characteristics of the bus (e.g., the modulation scheme). A data symbol can be as small as one bit in modern fiber optic transmission systems, and it can be as high as eight bits for premises distribution systems that use block code modulation. No matter how the modulation is performed for transmission over the bus segment 152-3, it is demodulated and converted into binary form in receiver 302.

Each received data symbol is distributed into a receive first-in-first-out circuit (FIFO) 303. A real-time controller 304 (including a CPU, a finite state machine and a program memory) checks for several data conditions on the incoming slot and generates the appropriate sequence of steps. It checks busy bit 210 to determine whether or not that slot is busy.

If the slot is not busy (e.g., 230), controller 304 makes the slot available to a contention resolution algorithm to enable a possible message transmission from station 103. The contention resolution algorithms that may be used with the disclosed system are well known and are not part of the present invention.

Thus, in the event that the incoming slot is not busy, the station memory 306 has a message to be transmitted, and it has been determined by the contention resolution protocol that it is station 103's turn, the controller 304 initiates the message transmission. The message is outputted a data symbol at a time from memory 306 via direct memory access (DMA) device 308 into a transmitting FIFO in 309. The FIFO 309 is similar to FIFO 303. At the appropriate instant of time, controller 304 enables, in a well known manner, the passage of data signals from the FIFO 309 through gate 310 to become the output of the transmitter device 311 sent over bus segment 152-4. Note, since the slot was empty no data is outputted from receiver 302 over lead 320. Controller 304 selectively loads the header 202 and trailer 204 infomation (including the logic 1 busy bit 210 and the logic 0 SR bit 214) via lead 321 to transmit device 311.

In the event slot (e.g. 240) is busy, controller 304 checks whether or not station 103 is the recipient of that slot. If the slot is destined to some other station, station 103 ignores the data. In that case, receiver 302 sends the data via lead 320 to transmitter device 311 for output over bus segment 152-4. If station 103 is one of the recipients of the slot, controller 304 initializes a transfer of data from FIFO 303 through direct memory access device 305 to the appropriate address in the station's memory 306 and sets the SR bit 214 to logic 1. Receiver 302 sends all the received data over lead 320 to transmitter device 311 where it is combined with slot read (SR) bit 214 outputted by controller 304 and outputted over bus segment 152-4.

Figure 4:
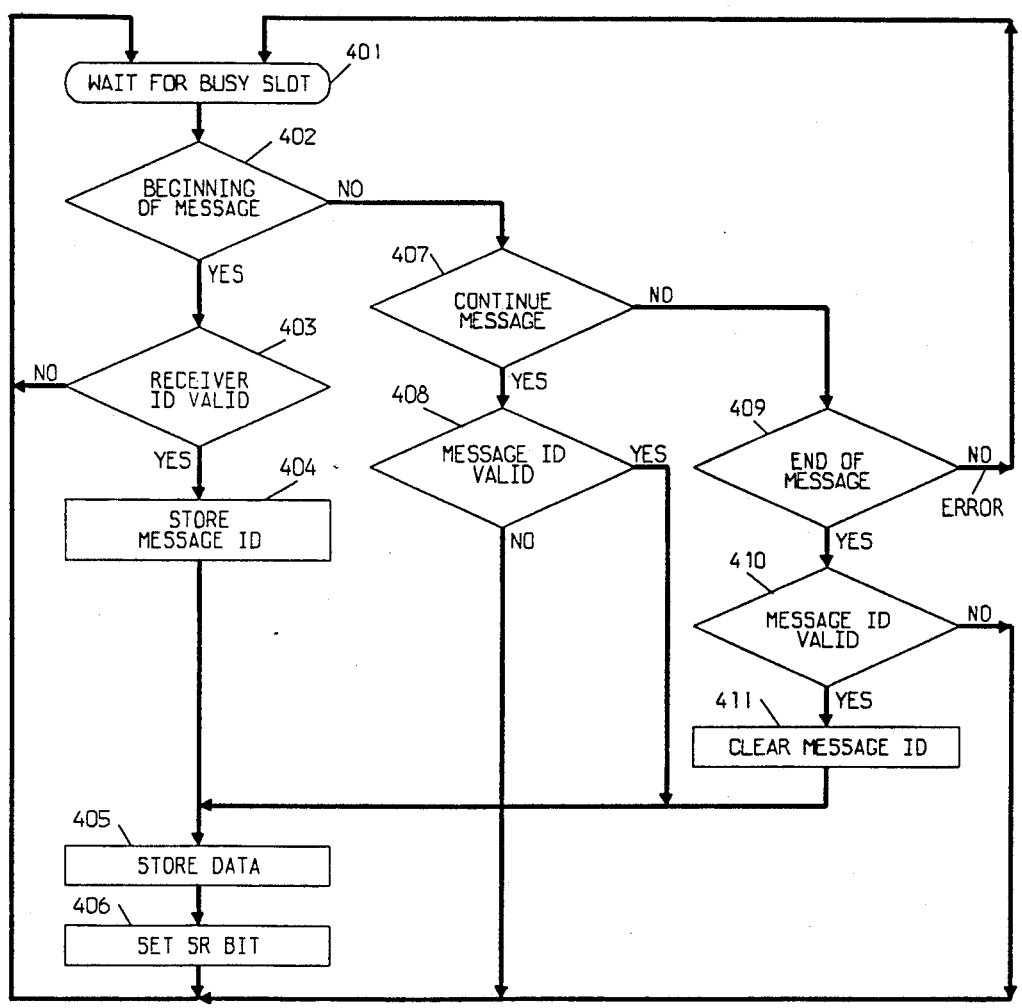
FIG. 4 shows a flow chart describing the receive operation of a station.

With reference to FIGS. 2, 3 and 4, the process of receiving information from slots is described more completely. Controller 304 of station 103 initially is in state 401 waiting for a busy slot to be received. When a busy slot is received controller 304 checks in step 402 if the slot represents the beginning of a message. Again, this is checked by reading segmentation and reassembly field (SAR) 209. If it is the beginning of a message, controller 304 verifies, in step 403, if the destination or receive station address (RID) 211 is valid; e.g., is station 103 the destination for this slot. If not, controller 304 returns to wait state 401. If station 103 is the destination then message identification number (MID) 216 is stored in the controller's 304 memory in step 404. In step 405 the data 212 is stored in memory 306. In step 406 the slot read (SR) bit 214 of slot 250 is set to logic 1. This is accomplished by controller 304 outputting, during SR bit 214 time a logic one via path 321 which is "OR"ed in transmitter device 311 for output to bus segment 152-4. Note, during this receive process slot 250 is being serially outputted over bus segment 152-4 bit-by-bit via receiver 302, path 320 and transmitter device 311. Path 322 is precluded from transmitting during the time when station 103 is not a message transmitter.

If controller 304 determines, in step 402, that the busy slot is not the beginning of the message, but a continuation of a message step 407, and a valid message identification number (MID) 216 is received, step 408, the data is stored in memory 306 in step 405. Controller 304 compares the received MID address (216) against the previously stored MID address (216) to determine its validity. If the destination address is not valid in step 408, controller 304 ignores the data and returns to wait state 401. If the slot represents the end of a message, step 409, and the MID address is valid, step 410, then the MID address (216) is cleared from the controller's 304 memory in step 411 and the data is stored in memory in step 405. If the busy slot was received in error, then in step 409, controller 304 returns to the wait state 401.

The functional blocks shown in FIG. 3 (as well as those of FIGS. 4 and 5) can be implemented using one or more integrated circuit chips using well-known Complementary Metal Oxide Semi-Conductors (CMOS), Very Large Scale Integrated (VLSI), Emitter Coupled Logic (ECL) or hybrid circuit technology. It is anticipated that other embodiments using any well-known semi-conductor technology can be utilized. Receiver 302 can be an optical integrator, a matched filter or an appropriate device for the combination of the bus physical media and modulation. The FIFOs in 303 and 309 can be made using shift registers or very fast Random Access Memory (RAM). The real-time controller 304 can be built using a VLSI circuit-implemented finite state machine, a Reduced Instruction Set Controller (RISC)-based microprocessor or any of the conventional microprocessors. The transmitter device 31 can be any device that performs a logical OR operation among the inputs and sends the data onto a bus using the appropriate modulation scheme.

Shown in FIG. 5 is a functional block diagram of the erasure node 107. There is an input from the bus segment 152-4 into the erasure node receiver 502. Receiver 502 converts the encoded or modulated signals used on bus 152 to the digital signal format used by erasure node 107. The received slot data symbols are directed through a FIFO 503 where a real-time controller 504 (including CPU a finite state machine) has immediate access to the incoming data. By the time a received slot has been stored in the FIFO 503, the controller 504 has made the decision as to whether or not the received slot should be erased. It also has decided which portion of data symbols, of the received slot, ought to be erased. Factors in that decision are: the status of slot read bit (SR) 214, the status of broadcast (multi-cast) bits (not shown), etc.

If the SR bit 214 is logic one and the slot is not marked as a broadcast message type, then the slot should be erased. Note, a broadcast message is a message which is to be distributed to a predefined group of stations some of which may be located on buses 120 and 121. The existence of a broadcast message is determined by checking virtual circuit identifier (VCI) 208 data or the received station identification (RID) 211 message and comparing it against known broadcast addresses located in the memory of controller 504. If, however, the SR bit 214 is logic one and the slot contains a broadcast message then erasure node 107 must determine whether or not all stations have already recieved the broadcast message. Again, this is done by checking the broadcast address against those stored in the memory of controller 504.

Once the controller 504 decides that the received slot (e.g., slot 250) should be erased, it selects which bits or data symbols of the slot are to be erased. After the data symbols to be erased in the slot have been selected by the controller 504, a multiplexer 505 is enabled and directs the appropriate pre-programmed sequence in Read-Only-Memory (ROM) 506 or (ROM) 507 to be combined with the received slot data from FIFO 503 in AND gate 508. The gate 508 transmits the combined data in slot format onto the bus segment 152-5. The result is that the erasure node 107 is able to selectively erase data symbols in received slots according to pre-established rules and based on information contained in the received slots. The empty slot 230 of FIG. 2 is illustrative of a received slot in which all the data symbols have been erased.

With reference to FIGS. 1 and 2, the effects of erasure node 107 erasing a used slot 250 to obtain the empty slot 230 enables downstream stations 104 and 105 to use that empty slot for communications between themselves or with stations on buses 120 and 121.

The receiver 502, the FIFOs in 503, and the real-time controller 504 are similar to those described for station 103 in FIG. 4. The transmitter device 508 can be any device that performs a logical AND operation among the inputs and which outputs the data onto a bus using the appropriate modulation scheme for bus segment 152-5. The multiplexer 505 can be built with a few logic gates and the pre-programmed sequences can be built using any of the various types of ROMs or Programmable Read-Only-Memory (PROMS). It is anticipated that other logic implementations can be utilized to produce the same results.

It should be noted that the functions of a station (e.g., 103) and erasure node 107 can be combined in a straightforward manner, into one apparatus so that when a busy slot 240 is received and determined to be used (e.g., slot 250) or addressed to this apparatus, the slot is erased to become an empty slot (e.g., slot 230). This is accomplished by combining the appropriate blocks of FIG. 3 with those of FIG. 5 to implement the desired functions of the combined apparatus.

Shown in FIG. 6 is a functional block diagram of an interface bridge 108 for interconnecting three buses (152, 120 and 121). It permits uni-directional transmissions from bus 150 and buses 120 and 121. It should be noted that interface apparatus 108 includes other similar arrangements of functional blocks (not shown) which enable transmission from bus 120 to buses 150 and 121 and transmission from bus 121 to buses 152 and 120. Interface bridge 108 is divided into three major parts: filtering circuit 602, routing circuit 603 and transmission buffer circuits 604 and 605 which operate under control of controller 601. Controller 601 includes a CPU and a program and data memory.

Filtering circuit 602 decides, for every slot received over bus 152-7, whether that slot is utilized (i.e., addressed) for inter or intra-bus communications. If filter circuit 602 detects that the received slot has been utilized for intra-bus communication that slot is discarded 606. If filter circuit 602 detects that the received slot has not been utilized for intra-bus communication it passes that slot to routing circuit 603.

Routing circuit 603 selects for every received inter-bus slot which one of the destination buses 120 or 121 should receive the slot and sends the slot to the associated transmission circuit 604 or 605. Transmission circuits 604 and 605 function like a station for transmitting all inter-bus traffic onto the respective buses 120 and 121.

The traditional design of a filtering circuit 602 makes use of large address look-up tables that keep the addresses of all stations local to bus 150. When a slot is received having a station address not contained in the address table, it is concluded that the message is an inter-bus message. Such a process is very time-consuming. In accordance with the present invention, the received slots that have been used for intra-bus traffic are marked with a slot read bit (SR) 214 set to logic one. Recall that SR bit 214 being set to logic one indicates that that slot has already reached its destination station.

Interface apparatus 108 uses circuitry similar to that used for the erasure node of FIG. 5 for filtering circuit 602. Thus, filtering circuit 602 functions like an erasure node 107 in FIG. 5 to detect the status of SR bit 214. Filtering circuit 602 discards the intra-bus slots (as shown by 605) without the need for checking addresses (e.g., receive identification station (RID) 211) in the received slot against stored local station address information. Implementing filtering circuit 602 using the erasure node 107 switching type operation (i.e., discard intra-bus slots, route interbus slots) significantly decreases the complexity and improves the performance of filtering circuit 602.

Routing circuit 603 includes an address look-up table for storing which destination addresses are associated with each of the remote buses 120 and 121. Routing circuit 603 obtains the destination address (i.e., RID 211) in the same manner as described for station 103. Routing circuit 603 then distributes the interbus slots to the appropriate transmitting circuits 604 and 605 for output to buses 120 and 121, respectively.

It should be noted that the functions of a station (e.g., 105) could be combined, in a straightforward manner, with interface apparatus 108 to implement a combined apparatus which functions so that when a busy slot 240 is received and determined to be a used slot 250 or addressed to the combined apparatus, the slot is erased to become an empty slot 230. This may be implemented by readily adapting or combining the appropriate blocks of FIG. 3 with those of FIG. 6 to implement the functions of the combined apparatus.

Moreover, it is contemplated that the station (e.g., 105), erasure node 107 and interface apparatus 108 can also be combined into one apparatus without deviating from the teachings of the present invention. Additionally, the functions of erasure node 107 may be combined, in accordance with the present invention, with the functions of interface apparatus 108 to implement yet another combined apparatus.

It is anticipated that different slot formats 220 and other well-known circuit architectures and devices can be used to successfully implement some or all the circuitry and functions of the present invention. Much of the implementation can be drastically changed, nevertheless, performing the same inventive functions. The slot and message formats presented in FIG. 2 are illustrative and aid in understanding the present invention. It is probable that the ATM slot format currently being formulated by the Comite Consultatif International Telegraphique et Telephonique (CCITT) will include only a header 202 and a payload field 203. In that case, all necessary control information located in the trailer section 204 will be located in header 202. Such an arrangement is inconsequential to the operation of the present invention since the slot read (SR) bit 214 utilized in operation of the erasure node 107 and interface apparatus 108 arrangements, could be placed anywhere (even in subsequent slots) as long as erasure node 107 and interface apparatus 108 are able to relate that SR bit 214 with the respective used slot. The SR bit 214 can be located in the slot that is being read and erased or can be located in a subsequent slot in accordance with the present invention. Thus, for example, the SR bit 214 for slot TS1 can be located in the header of a subsequent slot 222.

Moreover, while the present invention was described using a receiver station address as the destination station identifier, the present invention can be implemented using a media access control (MAC) address located in access control field (ACF) 207, a reassembly address like a message identification address (MID) 216, or a virtual circuit identifier (VCI) 208 as the destination station identifier.

Thus, what has been disclosed is merely illustrative of the present invention and other arrangements or methods can be implemented by those skilled in the art without departing from the spirit and scope of the present invention.

We claim:

1. Apparatus for receiving information in a first and second time interval from a TDM communication system and for transmitting a portion of said received information to at least one other TDM communication system, said apparatus comprising means for detecting a status of a slot read signal received in said second time interval of said information, and filter means for discarding said received information in response to a first value of said slot read signal and for transmitting said portion of received information to said at least one other TDM system in response to a second value of said slot read signal, said first value of said slot read signal indicating that the received information has been read by an apparatus of said TDM system.

2. The apparatus of claim 1 further comprising
routing means jointly responsive to said second value of said slot read signal and an address received in a first time interval for selecting one of said at least one other TDM system for transmitting said portion of received information thereto.

3. The apparatus of claim 2 wherein
said routing means includes
table means for storing one or more destination address entries which are associated with said at least one other TDM system and wherein
said routing means compares said received address with said entries in said table means for selecting said at least one other TDM system over which to transmit said portion of received information.

4. The apparatus of claim 1 wherein said apparatus is arranged to receive and transmit information in time slots and wherein said first and second time intervals are part of the same time slot.

5. The apparatus of claim 1 wherein said apparatus is arranged to receive and transmit information in time slots and wherein said first time interval is part of a first time slot and said second time interval is part of a subsequent second time slot.

6. The apparatus of claim 1 wherein said received information is formatted using an IEEE 802.6 protocol.

7. The apparatus of claim 1 wherein said apparatus is arranged to receive and transmit information in time slots including a header, a payload, and a trailer section and, wherein the first time interval is part of the payload section and the second time interval is part of the trailer section.

8. A method of operating apparatus used for receiving information in a first and second time interval from a TDM communication system and for transmitting apparatus of said received information to at lease one other TDM communication system, said method comprising the steps of detecting a status of a slot read signal received in said second time interval of said received information, discarding said received information in response to a first value of said slot read signal, said first value of said slot read signal indicating that the received information has been read by an apparatus of said TDM system and transmitting said portion of said received information to said at least one other TDM system in response to a second value of said slot read signal.

9. The method of claim 8 further comprising
selecting, in joint response to said second valve of said slot read signal and an address received in a first time interval, one of said at last one other TDM system for transmitting said portion of received information thereto.

* * * * *